Sept. 27, 1960 R. D. COVELY 3RD., ET AL 2,954,427
VISUAL DISPLAY SYSTEM
Filed May 12, 1953
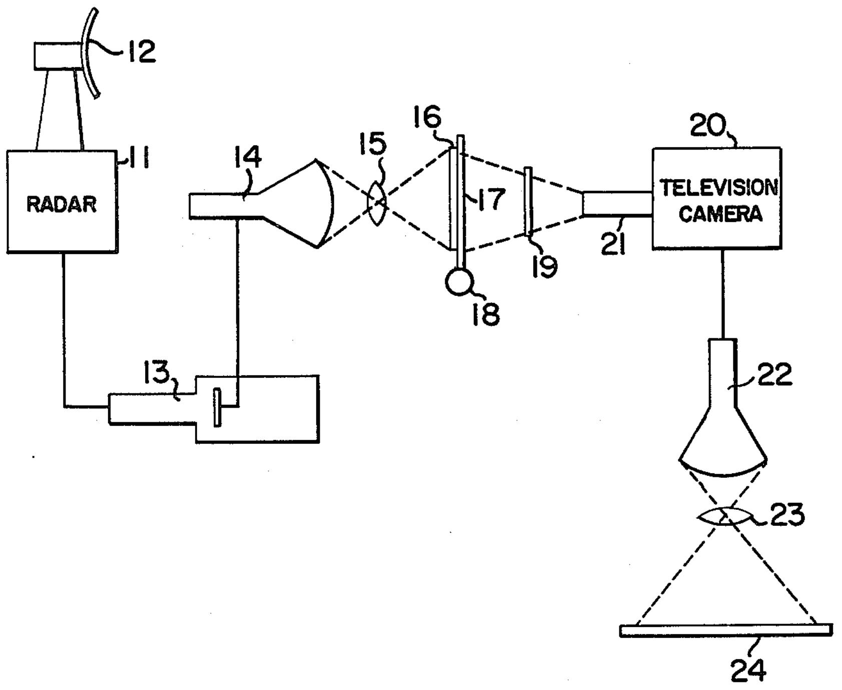
INVENTORS
FRANK D. COVELY, 3RD.
ROBERT AYRES
ARTHUR C. STOCKER
BY George Sipkin
H. H. Heintzen
ATTORNEYS

United States Patent Office 2,954,427
Patented Sept. 27, 1960

2,954,427

VISUAL DISPLAY SYSTEM

Robert D. Covely 3rd and Robert Ayres, Haddonfield, and Arthur C. Stocker, Collingswood, N.J., assignors, by mesne assignments, to the United States of America as represented by the Secretary of the Navy Filed May 12, 1953, Ser. No. 354,486

4 Claims. (Cl. 178—6.8)

This invention relates to improvements in visual display systems and more particularly to optical means for censoring information and for adding data to information.

A radar display often contains unwanted information and "noise." Apparatus for deleting such matter is desirable, especially so, if means are incorporated for adding additional data.

It is an object of this invention to provide apparatus for censoring unwanted information from displays.

It is a further object of this invention to provide apparatus for adding data to displays.

Other objects and advantages of the invention will hereinafter become more fully apparent from the following description of the annexed drawings, which illustrate a preferred embodiment, and wherein the single figure of the drawing is a schematic illustration of the invention.

Referring to the drawing, a radar apparatus 11, having a rotating directive antenna 12, feeds its information into a scan converter 13, which transforms the received information from a radar image to a television image. The converted images are transmitted to a projection kinescope 14 which projects a monochromatic (single color) television image through a lens system 15 on a diffusing screen 16. Superimposed on the diffusing screen 16 is a thin sheet of transparent plastic 17 such as Plexiglas which is edge illuminated by a lamp 18. A color filter 19 is interposed between the screen 16 and a television camera 20 having a lens system 21. The output of the television camera 20 is fed to a projection kinescope 22 which projects a television image of the desired information through a lens system 23 on a viewing screen 24.

It may be assumed that the radar apparatus 12 is of the PPI (plan position indication) type although this invention should not be construed as limited thereto. A PPI display utilizes a radial sweep, that is, the electron beam in the indicator is caused to move at a definite rate from the center of the screen outward and the deflecting coils are caused to rotate in synchronism with the rotating antenna.

Due to the persistence of the display tube screen and of the eye, a radial line is seen to rotate about the center of the tube. The electron beam is modulated by the received signals and the display corresponds to a map of the area with the antenna in the center, having a dark background and defining objects capable of reflecting radar pulses as lighter areas.

Radar displays often contain unwanted information. The pertinent information may be plotted with a wax crayon on the plastic sheet 17 and other information may also be added. The wax deposited by the crayon becomes luminous because it changes the critical angle of reflection of the edge lighting. A light image of the color of the edge lighting lamp 18 is accordingly produced on the sheet 17.

The television camera 20 picks up the image presented to it which includes the projected information from the diffusing screen 16 and the plotted information from the sheet 17. When the edge lighting lamp 18 is of a color different from that of the projected kinescope display, the two different color images can be distinguished and one or the other eliminated. If the kinescope image is green, the light source 18 could be chosen as yellow and a minus green filter 19, in front of the television camera 20 would pass only the yellow image and absorb, or reject, the green image. The final display on the viewing screen 24, would contain only that information which was plotted on the sheet 17.

The plotting and diffusing surfaces must have a diffusing characteristic to reproduce the image from the kinescope and must also have a transmission characteristic that will pass the image to the plotting surface. Since diffusing surfaces are in general not good transmitters of light, the surface must be a compromise between the two conflicting characteristics. To minimize the effects of parallax, the diffusing screen 16 should be placed with its diffusing side toward the thin plastic sheet 17.

It will be apparent from the above that this invention provides means for projecting information obtained by radar and the like apparatus on a screen for public viewing, that means are provided to add information to that obtained by the apparatus and to optically project only information substituted for the information received by the apparatus.

Although this invention has been described as suitable for use with radar, this is in no manner to be construed as limiting since the invention is suitable for use with any type of visually displayed information.

Obviously, many modifications and variations of this invention are possible in the light of the above teachings. It is therefore to be understood that within the scope of the appended claims, the invention may be practiced otherwise than as specifically described.

What is claimed is:

1. A projection-plotting mechanism, comprising a cathode-ray tube having a self-luminescent face and means for developing on said face an intensity-modulated image exhibiting a first limited spectral characteristic including a part of the visible spectrum, whereby said image may be visually observed, marker means selectively placeable in alignment with selected parts of said face and having an exposed surface of an otherwise-limited spectral characteristic including a part in the visible spectrum, whereby in diffuse light said marker means may clearly contrast with said image, and optical means including imaging means focused on said marker means and responsive to radiation within said otherwise-limited spectral characteristic.

2. A projection-plotting mechanism, comprising a cathode-ray tube having a self-luminescent face and means for developing on said face an intensity-modulated image exhibiting a first limited spectral characteristic including a part of the visible spectrum, whereby said image may be visually observed, marker means selectively placeable in alignment with selected parts of said face and having an exposed surface of an otherwise-limited spectral characteristic including a part in the visible spectrum, means for exposing said marker means to light within said otherwise-limited spectral characteristic, and optical means including imaging means focused on said marker means and responsive to radiation within said otherwise-limited spectral characteristic to the substantial exclusion of the predominant light within said first characteristic.

3. A visual display system which comprises means for receiving intelligence, kinescope means for converting said intelligence into a monochromatic television representation, a diffusing screen, lens means between the kinescope means and the diffusing screen for projecting said monochromatic representation on said diffusing screen, a transparent sheet positioned to receive said monochromatic representation from the diffusing screen, means for edge-lighting said transparent sheet with a selected color which is different from that of the monochromatic representation, said transparent sheet permitting its surface to be marked in order to plot desired portions of the monochromatic representation and produce a light image in the same color as that of the edge-lighting, a television camera positioned to receive light images from the transparent sheet as an input, color filter means interposed between said television camera and the transparent sheet for absorbing light images other than those of the color of the edge-lighting and for passing information of the same color as that of the edge-lighting, and other means for changing electrical output of the television camera into visual images.

4. A visual display system which comprises means for receiving intelligence, kinescope means for converting said intelligence into a monochromatic television representation, a diffusing screen, a transparent sheet mounted in face to face and contacting relation with the diffusing screen, means for edge-lighting the sheet in a color different from the monochromatic representation, lens means positioned between the kinescope means and the diffusing screen, a television camera positioned to receive the monochromatic representation from the diffusing screen for conversion into electrical signals, color filter means interposed between said television camera and the transparent sheet for absorbing the monochromatic representation transmitted by said kinescope, said transparent sheet permitting its surface to be marked in order to plot desired portions of the monochromatic representation and produce a light image in the same color as that of its edge-lighting whereby only representation in the color of the edge lighting will be received by said television camera.

References Cited in the file of this patent

UNITED STATES PATENTS

| | | |
|---|---|---|
| 1,988,931 | Alexanderson | Jan. 22, 1935 |
| 2,200,749 | Kemp | May 14, 1940 |
| 2,251,984 | Cleaver | Aug. 12, 1941 |
| 2,330,604 | Messner | Sept. 28, 1943 |
| 2,494,992 | Ferguson | Jan. 17, 1950 |
| 2,546,510 | Jones | Mar. 27, 1951 |